US008291157B2

(12) United States Patent
Bronson et al.

(10) Patent No.: US 8,291,157 B2
(45) Date of Patent: Oct. 16, 2012

(54) CONCURRENT REFRESH IN CACHE MEMORY

(75) Inventors: Timothy C. Bronson, Round Rock, TX (US); Hieu T. Huynh, Pflugerville, TX (US); Charlie C. Hwang, Hopewell Junction, NY (US); Kenneth D. Klapproth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/822,364

(22) Filed: Jun. 24, 2010

(65) Prior Publication Data

US 2011/0320700 A1  Dec. 29, 2011

(51) Int. Cl.
*G06F 12/00* (2006.01)
(52) U.S. Cl. ............. 711/106; 711/5; 711/105; 711/118
(58) Field of Classification Search .................. None
See application file for complete search history.

(56) References Cited

U.S. PATENT DOCUMENTS

| 7,649,796 | B2 | 1/2010 | Okuda et al. |
| 2009/0150629 | A1 | 6/2009 | Lee |

*Primary Examiner* — Shawn X Gu
(74) *Attorney, Agent, or Firm* — Cantor Colburn LLP; John Campbell

(57) ABSTRACT

Concurrent refresh in a cache memory includes calculating a refresh time interval at a centralized refresh controller, the centralized refresh controller being common to all cache memory banks of the cache memory, transmitting a starting time of the refresh time interval to a bank controller, the bank controller being local to, and associated with, only one cache memory bank of the cache memory, sampling a continuous refresh status indicative of a number of refreshes necessary to maintain data within the cache memory bank associated with the bank controller, requesting a gap in a processing pipeline of the cache memory to facilitate the number of refreshes necessary, receiving a refresh grant in response to the requesting, and transmitting an encoded refresh command to the bank controller, the encoded refresh command indicating a number of refresh operations granted to the cache memory bank associated with the bank controller.

22 Claims, 10 Drawing Sheets

CONCURRENT REFRESH IN CACHE MEMORY

BACKGROUND

This invention generally relates to cache memory, and in particular, to concurrent refresh in cache memory.

Embedded dynamic random access memory (EDRAM) requires periodic refresh operations to retain contents of memory cells. In order to reduce the adverse performance effects of this requirement, EDRAM may include a concurrent refresh feature. An EDRAM instance, or macro, may initiate an internal refresh operation during a functional fetch or store operation. The functional access is performed to one portion of the EDRAM macro, while the refresh operation is simultaneously performed to another portion of the EDRAM macro. The EDRAM macro may track the progress of the internally generated refresh activities and determine whether the internal refresh operations are sufficient to meet the refresh needs of the macro. If the rate of concurrent refresh is not sufficient for a given time period, the EDRAM macro may signal that a directed refresh command is required.

In a relatively large cache system, there may be considerable distance and latency separating a cache controller from the cache itself. The latencies involved render typical concurrent refresh signaling designs unusable. For example, a request for the furthest address sliced portion of a large cache for a directed refresh is an urgent request, requiring a break in pipeline access. The multiple cycle latency to and from the furthest banks add directly to the duration of the break in the access pipeline. Additionally, it is possible that the EDRAM macro may require more than one directed refresh command for a given time interval, requiring the cache controller to always create a break in the pipeline sufficient for the maximum of refresh commands. Further, the cache controller must keep access to the pipeline idle while verifying that sufficient refresh commands have been issued. It follows that the larger the cache, the longer the latency, which results in long idle periods for the processing pipeline.

BRIEF SUMMARY

An example embodiment of the present invention includes a computer program product for concurrent refresh in a cache memory, comprising a tangible storage medium readable by a processing circuit and storing instructions for execution by the processing circuit for performing a method. The method includes calculating a refresh time interval based upon system operating conditions at a centralized refresh controller, the centralized refresh controller being common to all cache memory banks of the cache memory, transmitting a starting time of the refresh time interval to a bank controller, the bank controller being local to, and associated with, only one cache memory bank of the cache memory, sampling a continuous refresh status indicative of a number of refreshes necessary to maintain data within the cache memory bank associated with the bank controller, the continuous refresh status being a combination of refresh request signals updated based on a concurrent refresh status of EDRAM macros in operative communication with the bank controller, requesting a gap in a processing pipeline of the cache memory to facilitate the number of refreshes necessary, receiving a refresh grant in response to the requesting, and transmitting an encoded refresh command to the bank controller, the encoded refresh command indicating a number of refresh operations granted to the cache memory bank associated with the bank controller.

An example embodiment of the present invention includes a system for concurrent refresh in a cache memory. The system includes at least one cache memory bank, a bank controller local to, and in communication with, the at least one cache memory bank, and a centralized refresh controller in communication with the bank controller, the centralized refresh controller configured to perform a method. The method includes calculating a refresh time interval based upon system operating conditions, transmitting a starting time of the refresh time interval to a bank controller, sampling a continuous refresh status indicative of a number of refreshes necessary to maintain data within the cache memory bank associated with the bank controller, the continuous refresh status being a combination of refresh request signals updated based on a concurrent refresh status of EDRAM macros in operative communication with the bank controller, receiving a refresh grant in response to the requesting, and transmitting an encoded refresh command to the bank controller, the encoded refresh command indicating a number of refresh operations granted to the at least one cache memory bank.

An example embodiment of the present invention includes a computer implemented method of concurrent refresh in a cache memory. The method includes calculating a refresh time interval based upon system operating conditions at a centralized refresh controller, the centralized refresh controller being common to all cache memory banks of the cache memory, transmitting a starting time of the refresh time interval to a bank controller, the bank controller being local to, and associated with, only one cache memory bank of the cache memory, sampling a continuous refresh status indicative of a number of refreshes necessary to maintain data within the cache memory bank associated with the bank controller, the continuous refresh status being a combination of refresh request signals updated based on a concurrent refresh status of EDRAM macros in operative communication with the bank controller, receiving a refresh grant in response to the requesting, and transmitting an encoded refresh command to the bank controller, the encoded refresh command indicating a number of refresh operations granted to the cache memory bank associated with the bank controller.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An example embodiment of the present invention provides cache refresh optimized for large cache memories. According to example embodiments, a cache refresh system may include a centralized cache refresh controller disposed to track and satisfy the refresh requirements of independent cache banks. The cache refresh system employs modified EDRAM macros which provide a continuous status of concurrent refresh progress. The statuses are gathered at the centralized cache refresh controller from localized cache memory bank controllers and used to predict when directed refresh commands will be required at each cache memory bank, and uses the prediction to request a gap or break in a processing pipeline to facilitate the directed refresh. If functional access operations have been frequent enough to allow concurrent refresh operations to satisfy the refresh requirements of the cache memory banks, no refresh commands are requested. If one or more refresh commands are required, a gap is created which is of minimal size based on the centralized predictions, thereby limiting dead cycles or idle processing pipeline periods corresponding to latency between cache banks and a cache controller.

Technical effects and benefits of example embodiments of the present invention include more accurate allotment of processing pipeline breaks designated for directed refresh operations, resulting in smaller processing pipeline gaps for refresh commands, and increased productivity.

Figure 1:
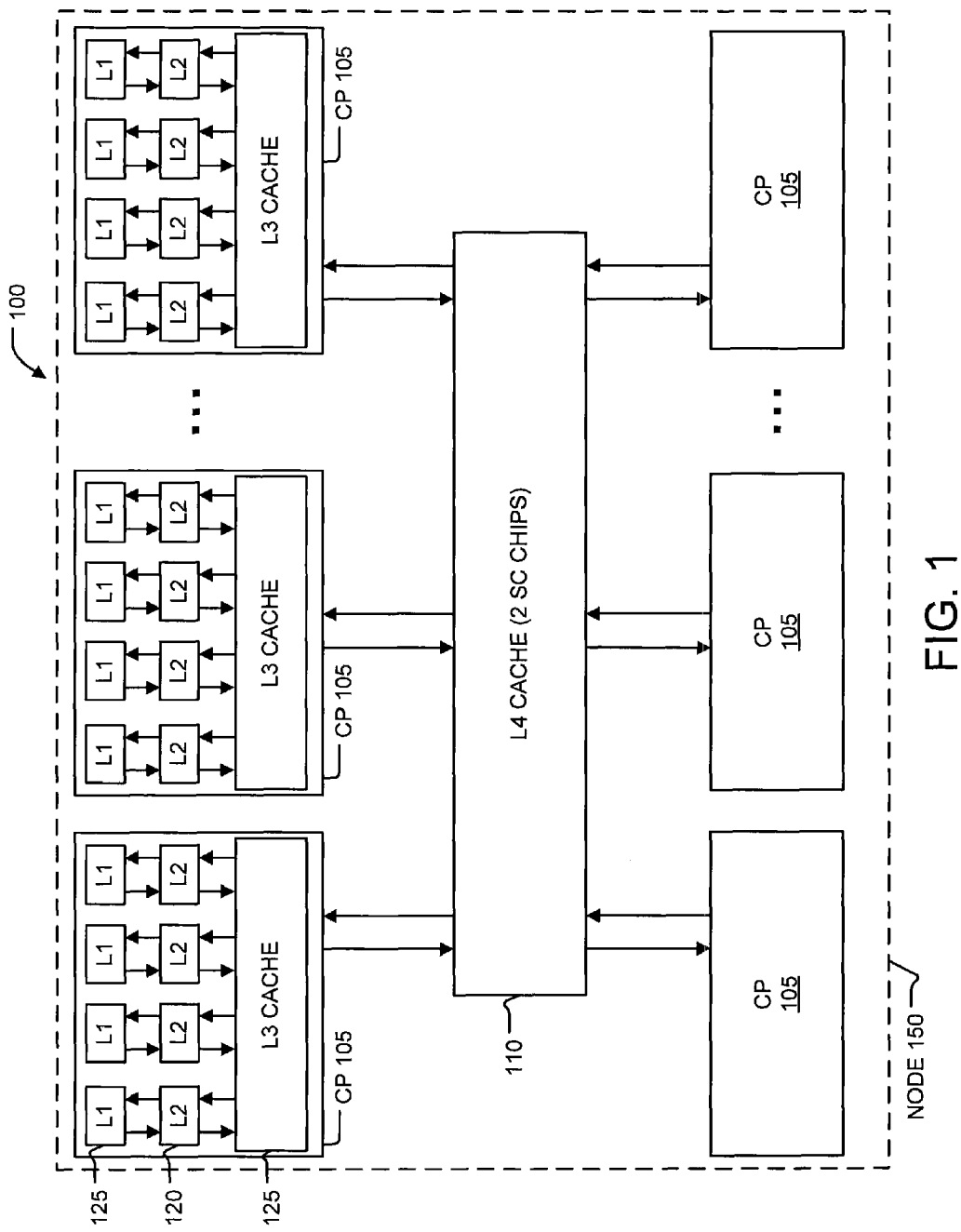
FIG. 1 depicts a state of the art cache topology.

FIG. 1 illustrates a state of the art cache topology 100. FIG. 1 illustrates a plurality of central processors (CP) 105 (e.g., central processing units) operatively connected via busses to one or more L4 caches 110. Although not shown in FIG. 1, each of the central processors 105 includes one or more cores which may perform reading and executing of instructions. On each central processor 105, the multiple cores may be operatively connected via busses to the L1, L2, and L3 caches 125, 120, and 115. The L1 caches 125 are physically closest to the cores, with the L2 caches 120 and the L3 caches 115 successively further from the cores. It is understood that the designation of caches may be reversed. Although the L3 and L4 caches 115 and 110 may comprise embedded dynamic random access memory (DRAM) which is referred to herein as EDRAM, it should be understood that any other type of suitable memory, such as DRAM, may be utilized. The plurality of central processors 105 operatively connected to the L4 caches 110 (e.g., two L4 caches) form a node 150. In a computing system, a plurality of nodes 150 may be operatively connected to one another for communications such as making and responding to requests, or any suitable operation.

Each individual central processor 105 may be fabricated on a separate chip, which may include the L1, L2, and L3 caches 125, 120, and 115. The L4 cache 110 may be fabricated on a separate chip, or a combination of separate chips. According to example embodiments of the present invention, the L4 cache 110 is formed on two (2) separate chips. Fabrication of the chips (including integrated circuits, wires, metal layers, semiconductor and/or other material components) may be facilitated through lithography and/or other suitable techniques. The fabrication process may include various deposition techniques including physical vapor deposition (PVD), chemical vapor deposition (CVD), electrochemical deposition (ECD), molecular beam epitaxy (MBE), atomic layer deposition (ALD) and/or any suitable technique.

Figure 2:
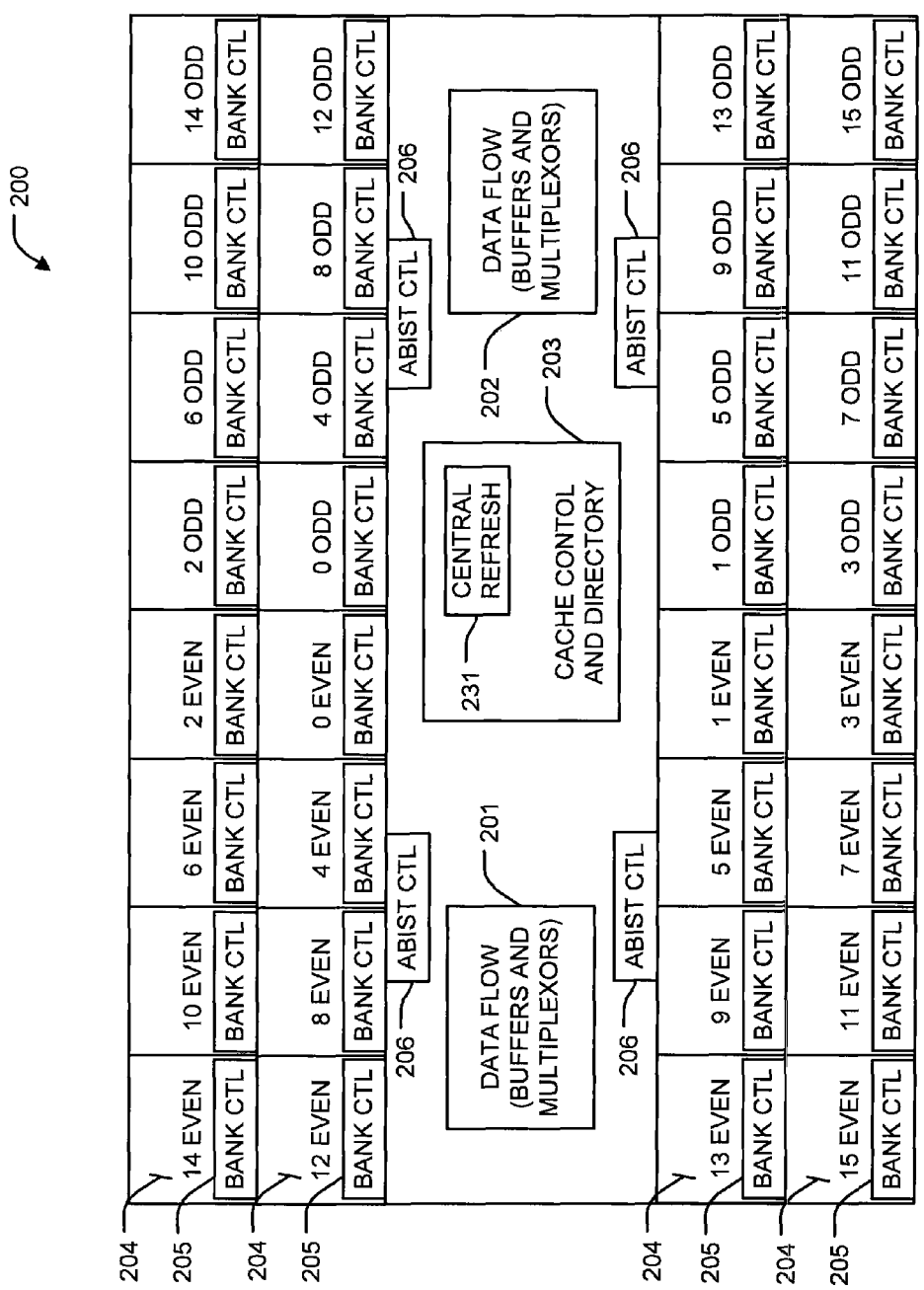
FIG. 2 depicts a logical layout of a single cache chip.

Turning to FIG. 2, a logical layout of a single cache chip is illustrated. For example, the cache may be a L4 cache. It should be understood that according to at least one example embodiment, an entire cache is divided amongst two chips, and therefore, a complete example cache would include two chips 200. A single chip 200 may include sixteen cache banks, divided into EVEN and ODD sections, labeled 0-15 EVEN/ODD (204). The cache banks 204 may each include a local bank controller 205. The local bank controller 205 may monitor and provide statuses of concurrent refresh operations of each EDRAM macro within an associated cache memory bank.

The chip 200 may also include data flow portions 201 and 202. The data flow portions 201 and 202 may include buffers and multiplexors (not illustrated for the sake of clarity) to facilitate data flow across the chip 200.

The chip 200 may further include a cache control and directory 203. The cache control and directory 203 provides control of cache reads/writes. The cache control and directory 203 includes a central refresh controller 231.

The central refresh controller 231 may be in communication with the plurality of bank controllers 205 and the plurality of array built-in self test (ABIST) controllers 206. Therefore, the central refresh controller 231 may receive refresh statuses from each of the plurality of bank controllers 205, thereby facilitating directed refresh requests based on concurrent refresh operations of each bank without the drawbacks of latency involved in direct requests from each cache memory bank.

Figure 3:
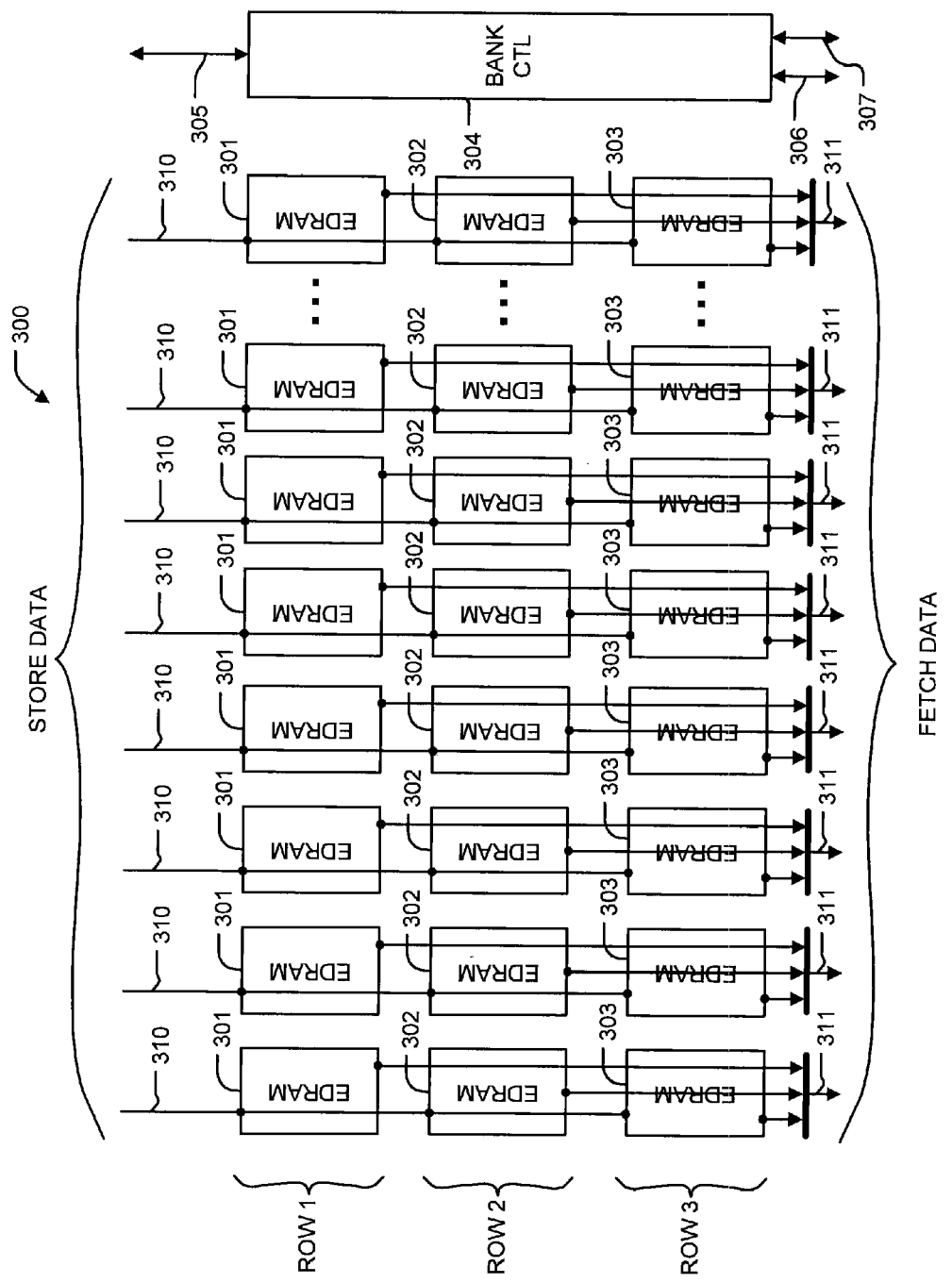
FIG. 3 depicts a logical view of a single cache bank.

FIG. 3 depicts a logical view of a single L4 cache bank. The cache bank 300 includes a plurality of EDRAM macros 301-303. The plurality of EDRAM macros 301-303 are divided into twenty-four (24) compartments arranged in three rows, labeled ROW 1, ROW 2, and ROW 3. ROW 1 includes the plurality of EDRAM macros 301, and provides eight compartments 0 through 7. ROW 2 includes the plurality of EDRAM macros 302, and provides eight compartments 8 through 15. ROW 3 includes the plurality of EDRAM macros 303, and provides eight compartments 16 through 23. Each EDRAM macro and consequently each ROW contains 1024 lines, addressable via 10 line address bits (not shown for clarity).

The cache bank 300 receives store data over a plurality of communication buses 310. The store data is stored in associated EDRAMS depending upon an associated compartment and line addresses. The cache bank 300 transfers fetched data over a plurality of communication buses 311. Each communication bus of the plurality of communication buses 310-311 may be a 16 byte wide communication bus comprised of individual 9-bit wide communication buses.

The cache bank additionally includes a local bank controller 304. The bank controller is in communication with the plurality of EDRAM macros 301-303, monitors the refresh statuses of EDRAM macros, and receives refresh request signals from the EDRAM macros over a daisy-chained request transmission system which is described more fully with reference to FIGS. 4-5. The bank controller 304 receives commands for functional accesses from a final pipe priority control macro over communication bus 305. The bank controller 304 receives ABIST commands from ABIST controllers over communication bus 306. The bank controller 304 receives refresh commands and transmits refresh statuses over communication bus 307.

Hereinafter, a more detailed description of concurrent refresh and refresh status monitoring is provided with reference to FIGS. 4-5.

Figure 4:
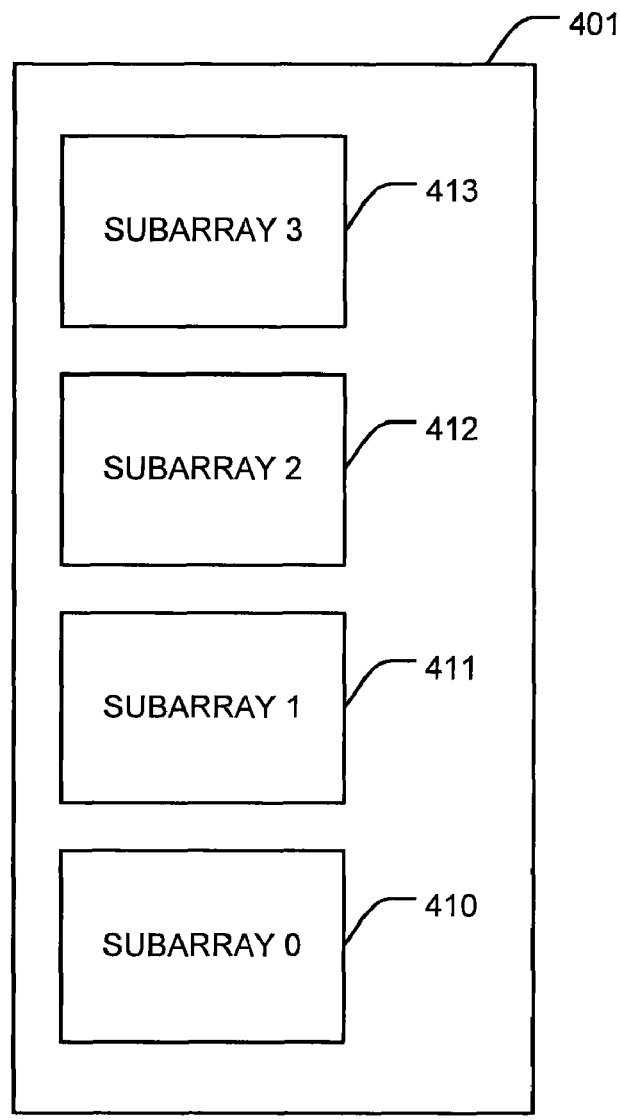
FIG. 4 depicts a logical view of an EDRAM macro.

FIG. 4 depicts a logical view of an EDRAM macro. The EDRAM macro 401 may include four internal subarrays 410, 411, 412, and 413. Generally, it is necessary to refresh every row of each subarray within a specific time period in order for DRAM cells of the EDRAM macro to retain their contents. During a functional access (e.g., read or write), a single subarray is accessed. The EDRAM macro is capable of executing a refresh command to one subarray simultaneously to a functional access to another subarray with no disruption of the functional access. The EDRAM macro includes a concurrent refresh engine (illustrated in FIG. 5) configured to initiate a refresh command whenever a functional access is initiated by system activity and a refresh command is needed. The refresh activity is paced by an external signal provided by the cache controller (RTIM, illustrated in FIG. 7). Each activation of RTIM marks the beginning of a refresh time period. The concurrent refresh engine attempts to refresh one row of each subarray during a refresh time period. If this requirement is not met, an explicit refresh command should be initiated by external system logic. During an explicit refresh command the EDRAM macro can refresh one row in each of two separate subarrays. The concurrent refresh engine and refresh commands are described more fully below with reference to FIG. 5.

Figure 5:
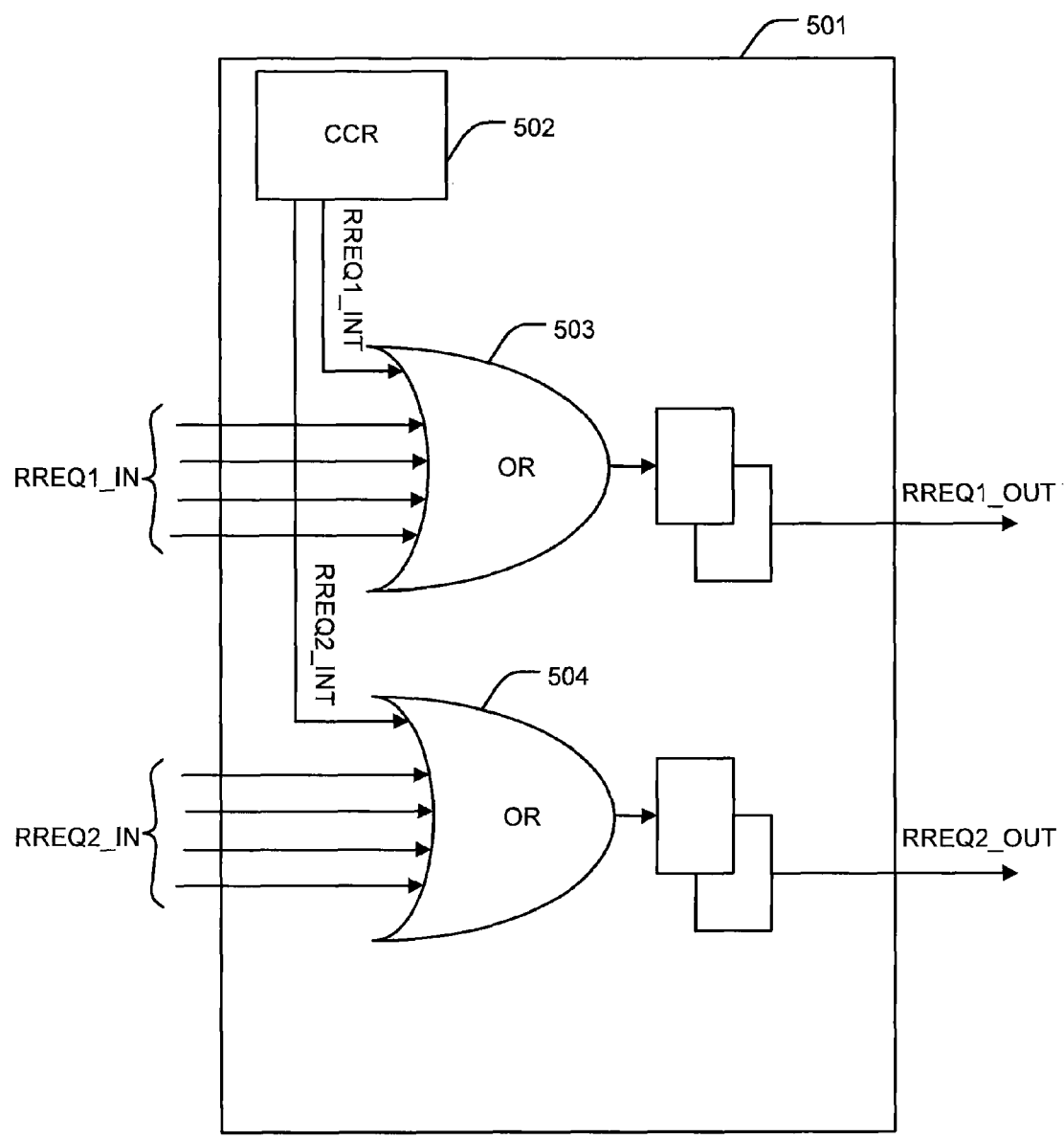
FIG. 5 depicts a logical view of an EDRAM macro refresh request system.

FIG. 5 depicts a logical view of an EDRAM macro refresh request system. The EDRAM macro 501 includes a concurrent refresh engine CCR 502 in communication with two logical OR gates 503 and 504. The CCR 502 generates two refresh request signals RREQ1_INT and RREQ2_INT to communicate with the system regarding the status of refresh operations. The two signals indicate the number of refresh commands required to satisfy the refresh requirement for a particular RTIM period. The encoding of the two signals is provided in Table 1, below:

TABLE 1

| RREQ2_INT | RREQ1_INT | COMMANDS REQUIRED |
| --- | --- | --- |
| 0 | 0 | 0 |
| 0 | 1 | 1 |
| 1 | 0 | 2 |
| 1 | 1 | 2 |

Both signals are raised at the beginning of each RTIM period. The signals are updated as concurrent refresh activities satisfy the refresh requirement for the EDRAM macro, and thus maintain a real-time indication of the number of refresh commands required within a RTIM period.

As also illustrated in FIG. 5, the EDRAM macro 501 receives a plurality of RREQ1_IN and RREQ2_IN refresh signals from neighboring EDRAM macros within the same cache memory bank row. For example, the EDRAM macro 501 may receive two refresh request signals from each neighboring EDRAM macro, and therefore, these EDRAM macros may not need the logical OR gates illustrated in FIG. 5. More clearly, EDRAM macro 501 is configured to logically OR the refresh request signals from neighboring cells and output the logical result to a local bank controller. Therefore, the refresh signals from a plurality of EDRAM macros may be daisy-chained together to provide only two refresh signals for an entire row of EDRAMS.

Hereinafter, concurrent refresh monitoring and refresh control is described more fully with reference to FIGS. 6-7.

Figure 6:
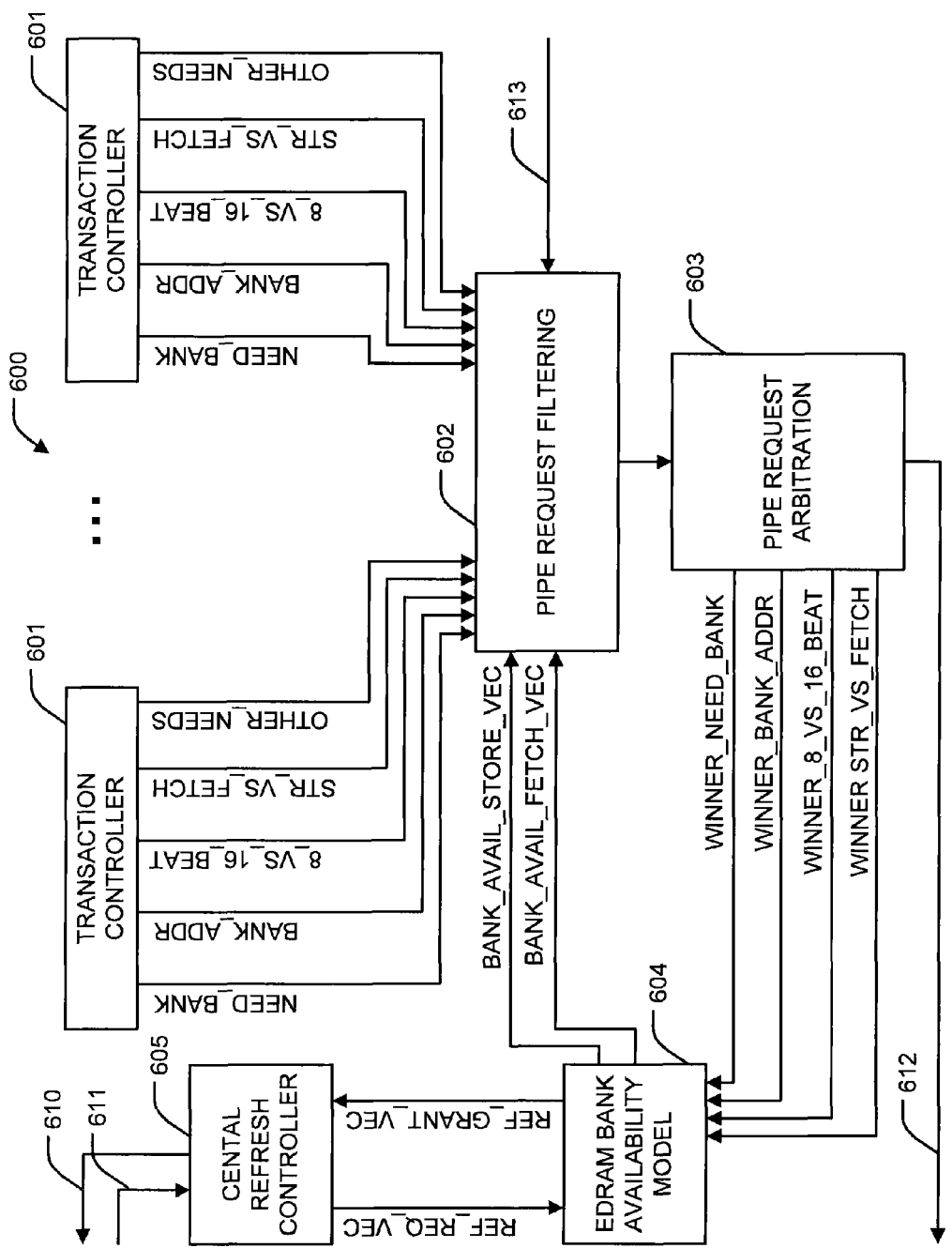
FIG. 6 depicts a cache controller with concurrent refresh monitoring.

FIG. 6 depicts a cache controller with concurrent refresh monitoring. The cache controller 600 may include a plurality of transaction controllers 601. The plurality of transaction controllers 601 compete for access to the cache transaction pipeline. Different types of transactions have different resource requirements for successful completion of a pipe mass.

The cache controller 600 further includes pipe request filtering unit 602 in communication with the transaction controllers 601. The filtering unit 602 filters requests based on the availability of the resources the requests require. The filtering unit 602 receives requests from the transaction controllers 601 and receives resource availability vectors from both an EDRAM availability model 604 and other resource availability vectors 613.

The cache controller 600 further includes pipe request arbitration unit 603. The arbitration unit 603 is a multi-level arbiter which is configured to choose a single filtered request for entry into the transaction pipeline for every cycle there is an active filtered request. Cache access commands from the arbitrations unit 603 are sent to bank controllers over communications bus 612.

The cache controller 600 further includes the EDRAM bank availability model 604 in communication with the filtering unit 602 and the arbitration unit 603. The cache controller 600 further includes a central refresh controller 605 in communication with the EDRAM bank availability model 604.

The bank availability model 604 receives refresh request vectors (e.g., encoded as in Table 1) from the central refresh controller 605. The EDRAM availability model 604 transmits refresh grant vectors to the central refresh controller 605 in response to the request vectors. For example, the EDRAM bank availability model 603 provides bank availability vectors for both store and fetch operations to the filtering unit 602. Filtered requests are provided from the filtering unit 602 to the arbitration unit 603. The arbitration unit 603 provides information related to a chosen single filtered request to the EDRAM bank availability model 604, such that the EDRAM bank availability model may determine which refresh requests contained in received refresh requests vectors may be granted. Thereafter, the EDRAM bank availability model returns the granted requests as a vector to the central refresh controller 605. The central refresh controller transmits associated refresh commands to bank controllers over communication bus 610, and receives updated refresh request vectors from the bank controllers at communication medium 611.

Hereinafter, a more detailed description of a central refresh controller is provided with reference to FIG. 7.

Figure 7:
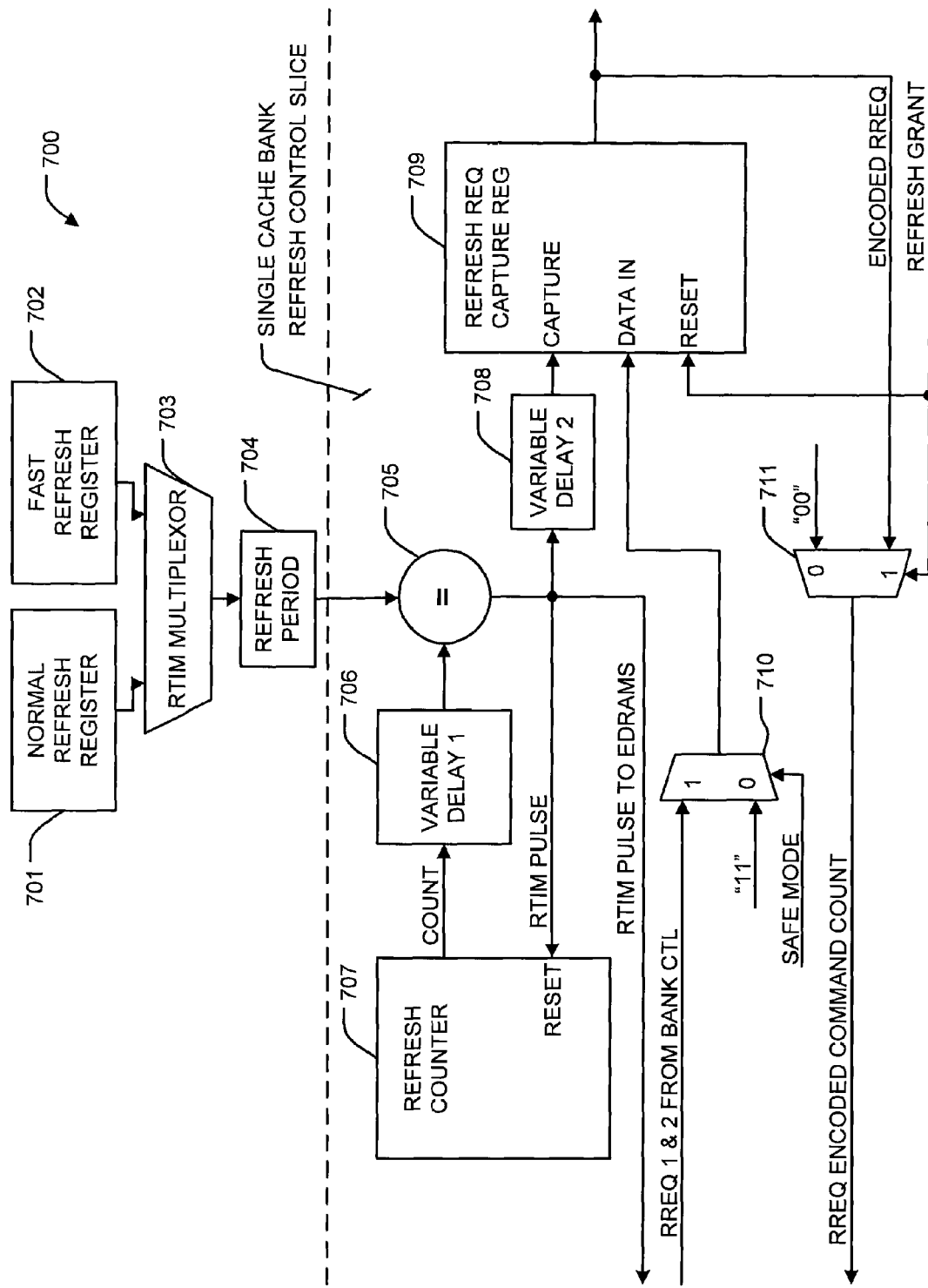
FIG. 7 depicts a central refresh controller.

FIG. 7 depicts a central refresh controller. The central refresh controller 700 may include a normal refresh register 701 and a fast refresh register 702. The normal refresh register 701 may provide a refresh frequency value for typical system operating conditions. The fast refresh register 702 may provide an increased refresh frequency value. For example, an increased refresh frequency may be necessary in the event of cooling system malfunctions, environmental changes, or other events which would otherwise reduce the amount of time values are stable within an EDRAM macro.

The central refresh controller 700 further includes RTIM multiplexor 703 in communication with both the normal refresh register 701 and the fast refresh register 702. The RTIM multiplexor 703 facilitates selection between normal and fast refresh frequency values.

The central refresh controller further includes refresh period unit 704 in communication with the RTIM multiplexor 704. The unit 704 provides a refresh period based on the selected frequency. It is noted that the elements 701-704 may be single elements within the central refresh controller 700, while the remaining elements illustrated may be implemented once for each cache memory bank. For example, the central refresh controller may be sliced into portions representing each cache memory bank. Each of the sliced portions may include implementations of elements 705-711 described below, while elements 701-704 are common to all sliced portions. The description provided below thus is representative of a single cache memory bank, and the simplified illustration representing one sliced portion is intended to be illustrative only. It should be understood that several implementations of the elements 705-711 are necessary for cache refresh monitoring of more than one cache bank.

Returning to FIG. 7, the refresh period from unit 704 is compared to a refresh count through comparator 705, the output of which is active when both inputs are equal, resulting in a single cycle pulse that is forwarded as a RTIM pulse to an EDRAM bank controller associated with the illustrated sliced portion of the cache central controller 700. The RTIM pulse is also provided as a reset signal to a refresh counter 707, forcing it to end counting for the current refresh interval and begin counting for the next refresh time interval. The output of counter 707 feeds a variable delay 706, and the variable delay 706 in turn provides the refresh count to the comparator 705. The variable delay 706 of each central refresh controller slice may be configured to each provide a different delay, such that refresh requests, and consequently refresh grants, are staggered. This may facilitate reduced noise due to staggering system refresh commands versus simultaneously issuing refresh commands The central refresh controller 700 further includes refresh request capture register 709 coupled to variable delay 708 which is coupled to the comparator 705. The refresh request capture register captures data in response to a delayed RTIM pulse provided through variable delay 708. Variable delay 708 provides a means of adjusting the refresh request sample time within the refresh time interval.

The data captured at refresh request capture register 709 is provided from MUX 710. The MUX 710 is in operative communication with the bank controller, and receives the daisy-chained RREQ1 and RREQ2 signals described above with reference to FIG. 5. The daisy-chained RREQ1 and RREQ2 are continuously provided and are updated continuously by each bank controller. In this manner, the daisy-chained RREQ1 and RREQ2 provide a real-time status which is relatively unaffected by latency issues arising from conventional hand-shaking in cache refresh requests. The refresh request capture register 709 transmits the sampled values of the encoded RREQ signals to the bank availability model and to MUX 711. Upon receipt of a refresh grant, the MUX 711 selects the encoded RREQ signals and transmits the same to the bank controller. Until receipt of a refresh grant, the MUX 711 is configured to transmit a vector of logical zeroes representing no granted requests. Also upon receipt of a refresh grant, the refresh request capture register is reset and new data is captured from MUX 710 at the desired sample time determined by the receipt of another delayed RTIM pulse from variable delay 708.

It is noted that under some circumstances, for example under a fast refresh frequency requirement, the MUX 710 may be set into "SAFE MODE" where a vector of logical ones representing a maximum number of requests is always passed to the refresh request capture register 709.

Hereinafter, methods of cache refresh are described in detail with reference to FIGS. 8-9.

Figure 8:
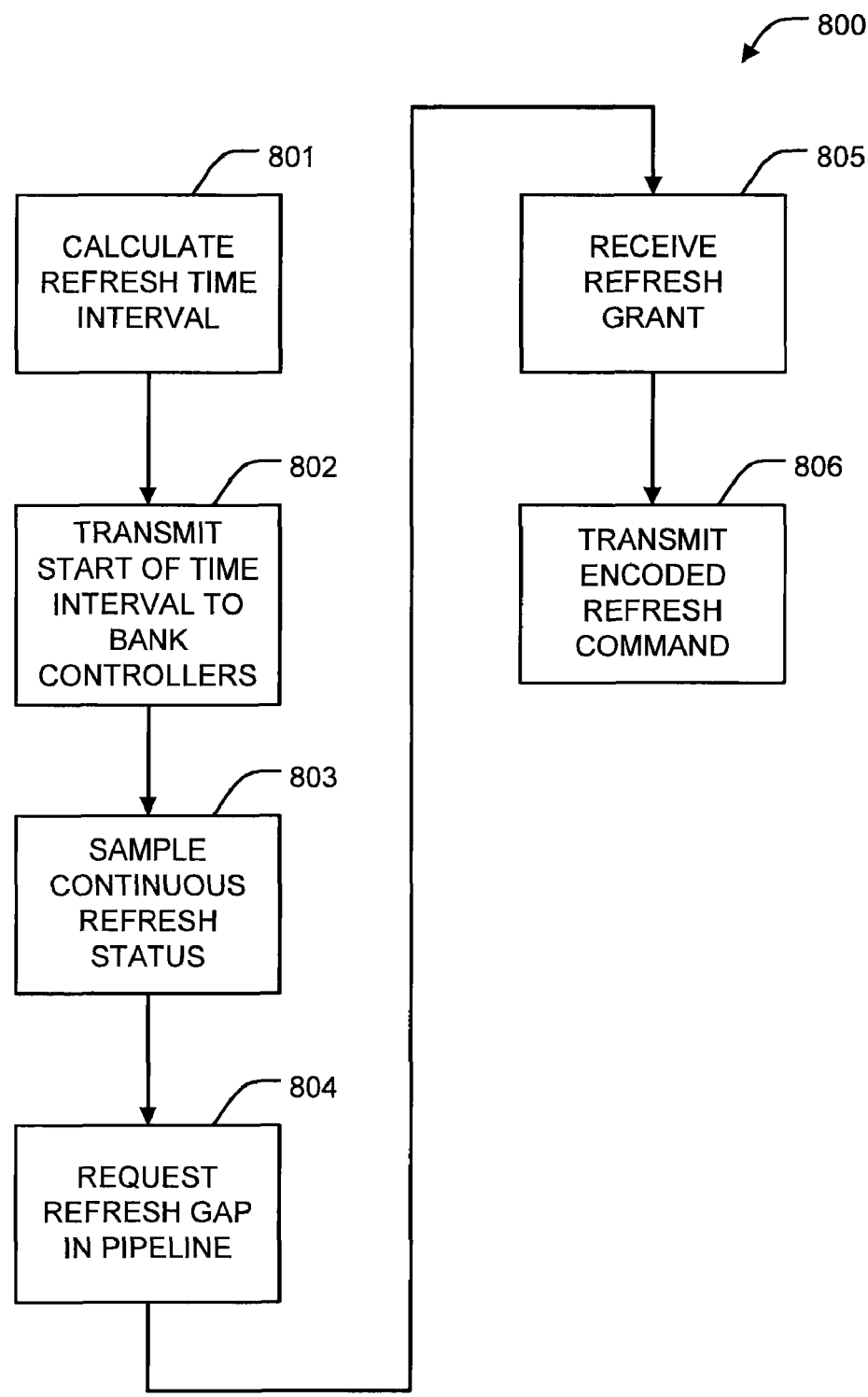
FIG. 8 depicts a method of cache refresh.

FIG. 8 depicts a method of cache refresh in terms of operation of a central refresh controller. The method 800 includes calculating a refresh time interval at block 801. For example, a refresh time interval may be based on a normal refresh frequency, a fast refresh frequency, a programmable refresh frequency, or any suitable frequency for refresh based upon system parameters such as temperature, etc.

Thereafter, the method 800 includes transmitting the start of each new refresh time interval to bank refresh controllers at block 802. Upon receipt of the start of a new refresh time interval, refresh request encoded vectors representing the output of a daisy-chain of refresh request signals are set to the maximum number of refresh requests required for a refresh time interval at each EDRAM macro. Thereafter, the bank controller collects and provides a real time status of the number of refresh commands required to meet the refresh requirements for the refresh time interval in progress. The status is a continuous signal provided by the bank controller, which is updated as concurrent refresh in each EDRAM macro progresses. The status is sampled at block 803 at an appropriate sample point within the refresh time interval determined by a delayed version of the refresh interval starting time as described above In response to sampling of the refresh statuses, the method 800 may include requesting a gap in a processing pipeline at block 804. For example, a central refresh controller may submit the refresh statuses in the form of refresh request vectors to a bank availability model. The bank availability model may in turn provide a gap in the processing pipeline by deactivating the bank available vectors provided to an arbitration unit of a cache control. Thereafter, the bank availability model issues a grant to the central refresh controller which is transmitted to associated bank controllers at blocks 805 and 806. Hereinafter, another method of cache refresh is described with reference to FIG. 9.

Figure 9:
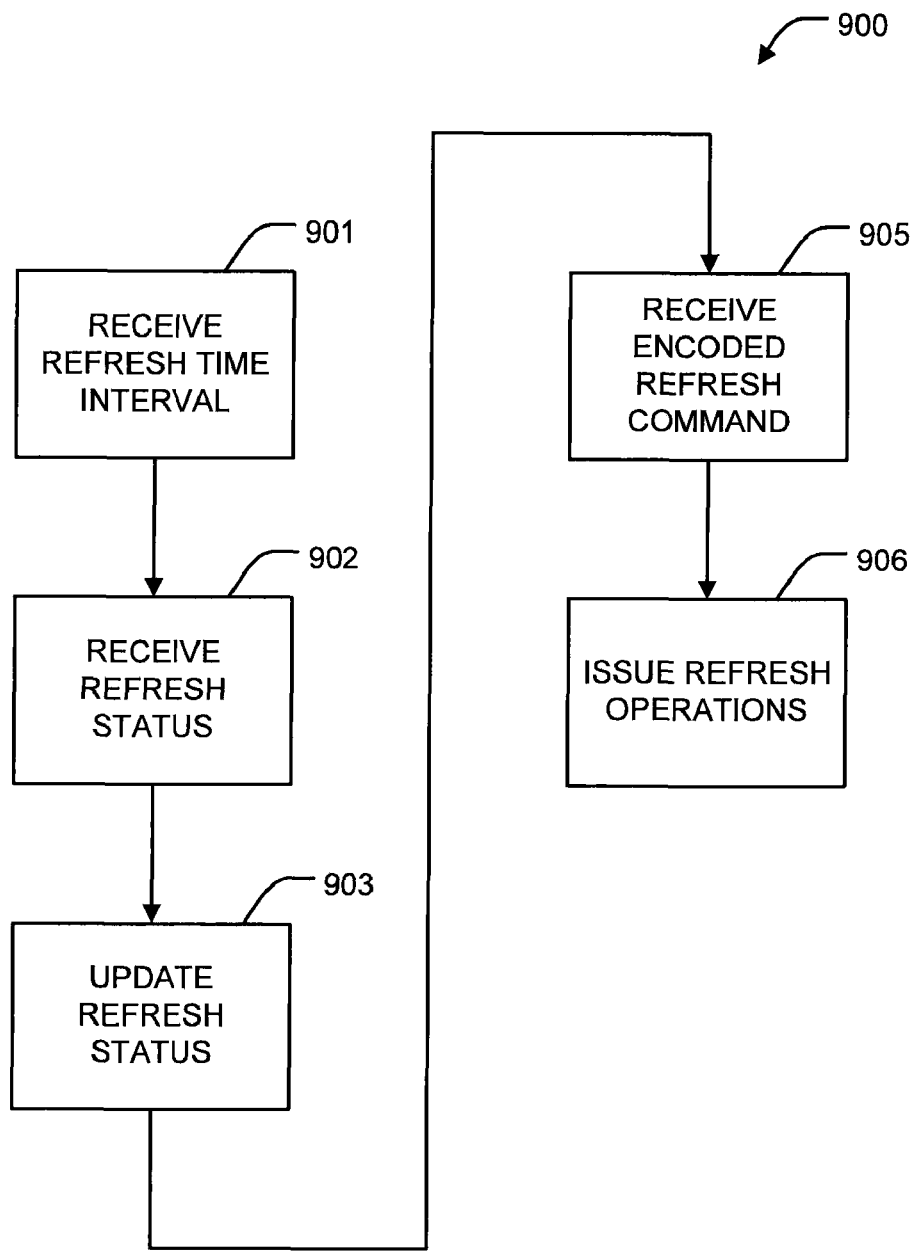
FIG. 9 depicts a method of cache refresh.

FIG. 9 depicts a method of cache refresh in terms of operation of a bank controller. The method 900 includes receiving a starting time of a refresh time interval at block 901. The starting time of the refresh time interval may be received from a central refresh controller as a RTIM pulse which marks the beginning of a new interval the end of the prior interval as described above. In response to the received refresh time interval, the method 900 includes broadcasting the RTIM pulse to all EDRAM macros within the bank, which subsequently update the refresh status for the cache bank associated with the bank controller at block 902. For example, a daisy-chain of refresh request signals may be received at the bank controller which are used to continuously update RREQ signals provided to a central refresh controller.

The method 900 further includes updating the refresh status at block 903. For example, the refresh status may be transmitted to a central bank controller as continuously updated RREQ signals as described above.

The method 900 further includes receiving an encoded refresh command at block 905. The encoded refresh command may include the granted number of refresh operations required by the cache memory bank associated with the bank controller. Thereafter, the method 900 includes issuing the granted number of refresh operations within the cache memory bank associated with the bank controller.

As described above, example embodiments of the present invention provide cache refresh systems/methodologies optimized for large cache memories. According to example embodiments, a cache refresh system may include a centralized cache refresh controller disposed to track and satisfy the refresh requirements of independent cache banks. The cache refresh system employs modified EDRAM macros which provide a continuous status of concurrent refresh progress, updated in response to a refresh time pulse (RTIM). The statuses are gathered at the centralized cache refresh controller from localized cache memory bank controllers and used to predict when directed refresh commands will be required at each cache memory bank. The centralized cache refresh controller uses the prediction to request a gap or break in a processing pipeline to facilitate the directed refresh. If functional access operations have been frequent enough to allow concurrent refresh operations to satisfy the refresh requirements of the cache memory banks, no refresh commands are requested. If one or more refresh commands are required, a gap is created which is of minimal size based on the centralized predictions, thereby limiting dead cycles or idle processing pipeline periods corresponding to latency between cache banks and a cache controller.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 10:
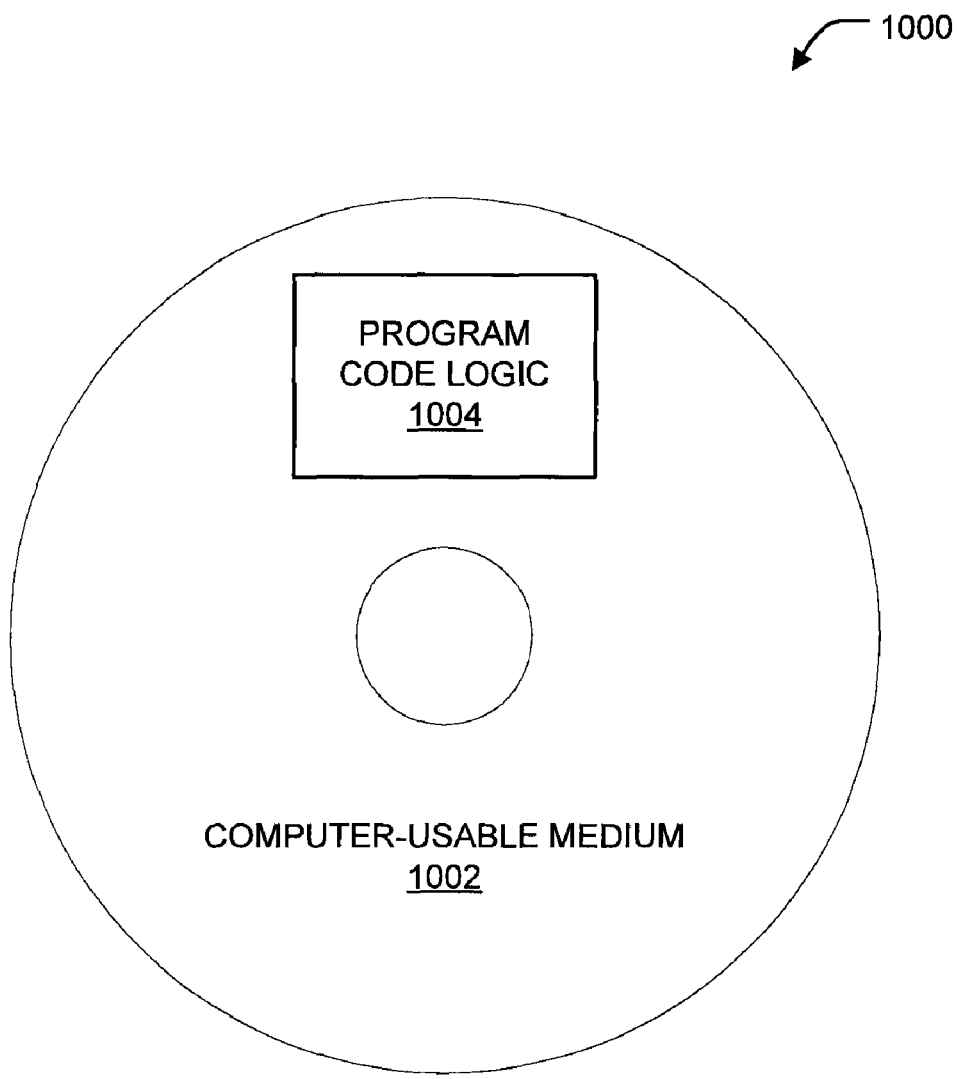
FIG. 10 depicts a computer program product.

As described above, embodiments can be embodied in the form of computer-implemented processes and apparatuses for practicing those processes. In exemplary embodiments, the invention is embodied in computer program code executed by one or more network elements. Embodiments include a computer program product 1000 as depicted in FIG. 10 on a computer usable medium 1002 with computer program code logic 1004 containing instructions embodied in tangible media as an article of manufacture. Exemplary articles of manufacture for computer usable medium 1002 may include floppy diskettes, CD-ROMs, hard drives, universal serial bus (USB) flash drives, or any other computer-readable storage medium, wherein, when the computer program code logic 1004 is loaded into and executed by a computer, the computer becomes an apparatus for practicing the invention. Embodiments include computer program code logic 1004, for example, whether stored in a storage medium, loaded into and/or executed by a computer, or transmitted over some transmission medium, such as over electrical wiring or cabling, through fiber optics, or via electromagnetic radiation, wherein, when the computer program code logic 1004 is loaded into and executed by a computer, the computer becomes an apparatus for practicing the invention. When implemented on a general-purpose microprocessor, the computer program code logic 1004 segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product for concurrent refresh in a cache memory, the computer program product comprising a tangible storage medium readable by a processing circuit and storing instructions for execution by the processing circuit for performing a method comprising:
   calculating a refresh time interval based upon system operating conditions at a centralized refresh controller, the centralized refresh controller being common to all cache memory banks of the cache memory;
   transmitting a starting time of the refresh time interval to a bank controller, the bank controller being local to, and associated with, only one cache memory bank of the cache memory;
   sampling a continuous refresh status indicative of a number of refreshes necessary to maintain data within the cache memory bank associated with the bank controller, the continuous refresh status being a combination of refresh request signals updated based on a concurrent refresh status of embedded dynamic random access memory (EDRAM) macros in operative communication with the bank controller;
   requesting a gap in a processing pipeline of the cache memory to facilitate the number of refreshes necessary;
   receiving a refresh grant in response to the requesting; and
   transmitting an encoded refresh command to the bank controller, the encoded refresh command indicating a number of refresh operations granted to the cache memory bank associated with the bank controller.

2. The computer program product of claim 1, wherein the method further comprises:
   receiving the starting time of the refresh time interval at the bank controller; and
   updating the continuous refresh status.

3. The computer program product of claim 1, wherein the method further comprises:
   receiving the starting time of the refresh time interval at the bank controller; and
   updating the continuous refresh status, the continuous refresh status update being gathered as a logical OR output of a plurality of EDRAM macro refresh requests, each refresh request of the plurality of EDRAM macro refresh requests representing a maximum number of refresh operations required by each respective EDRAM macro.

4. The computer program product of claim 1, wherein calculating the refresh time interval includes:
   selecting between a predetermined number of different refresh frequencies.

5. The computer program product of claim 4, wherein the predetermined number of different refresh frequencies include at least a normal refresh frequency and a fast refresh frequency.

6. The computer program product of claim 5, wherein the fast refresh frequency is selected in response to increased system temperature.

7. The computer program product of claim 1, wherein a plurality of different refresh time interval starting times are transmitted to a plurality of different bank controllers, each bank controller being local to, and associated with, only one cache memory bank of the cache memory, and each cache memory bank of the cache memory being associated with only one bank controller.

8. The computer program product of claim 7, wherein the plurality of different refresh time interval starting times are staggered.

9. A system for concurrent refresh in a cache memory, comprising:
   at least one cache memory bank;
   a bank controller local to, and in communication with, the at least one cache memory bank;
   a centralized refresh controller in communication with the bank controller, the centralized refresh controller configured to perform a method, comprising:
      calculating a refresh time interval based upon system operating conditions;
      transmitting a starting time of the refresh time interval to a bank controller, the bank controller being local to, and associated with, only one cache memory bank of the cache memory;
      sampling a continuous refresh status indicative of a number of refreshes necessary to maintain data within the cache memory bank associated with the bank controller, the continuous refresh status being a combination of refresh request signals updated based on a concurrent refresh status of embedded dynamic random access memory (EDRAM) macros in operative communication with the bank controller;
      requesting a gap in a processing pipeline of the cache memory to facilitate the number of refreshes necessary to maintain data within the cache memory bank associated with the bank controller;
      receiving a refresh grant in response to the requesting; and transmitting an encoded refresh command to the bank controller, the encoded refresh command indicating a number of refresh operations granted to the at least one cache memory bank.

10. The system of claim 9, wherein the method further comprises:
receiving the starting time of the refresh time interval at the bank controller; and
updating the continuous refresh status.

11. The system of claim 9, wherein the method further comprises:
receiving the starting time of the refresh time interval at the bank controller; and
updating the continuous refresh status, the continuous refresh status update being gathered as a logical OR output of a plurality of EDRAM macro refresh requests, each refresh request of the plurality of EDRAM macro refresh requests representing a maximum number of refresh operations required by each respective EDRAM macro.

12. The system of claim 9, wherein calculating the refresh time interval includes:
selecting between a predetermined number of different refresh frequencies.

13. The system of claim 12, wherein the predetermined number of different refresh frequencies include at least a normal refresh frequency and a fast refresh frequency.

14. The system of claim 13, wherein the fast refresh frequency is selected in response to increased system temperature.

15. The system of claim 9, further comprising a plurality of cache memory banks, each cache memory bank including a single bank controller associated therewith, wherein the method further comprises:
calculating a plurality of different refresh time intervals;
transmitting starting times of the plurality of different refresh time intervals to the plurality of bank controllers;
sampling refresh statuses indicative of a number of refreshes necessary to maintain data within the plurality of cache memory banks;
requesting a gap in a processing pipeline of the cache memory to facilitate the number of refreshes necessary to maintain data within the plurality of cache memory banks;
receiving a refresh grant in response to the requesting a gap in a processing pipeline of the cache memory to facilitate the number of refreshes necessary to maintain data within the plurality of cache memory banks; and
transmitting an encoded refresh command to the plurality of bank controllers, the encoded refresh command transmitted to the plurality of bank controllers indicating a number of refresh operations granted to associated cache memory banks.

16. The system of claim 15, wherein the plurality of different refresh time interval starting times are staggered.

17. A computer implemented method of concurrent refresh in a cache memory, the method comprising:
calculating a refresh time interval based upon system operating conditions at a centralized refresh controller, the centralized refresh controller being common to all cache memory banks of the cache memory;
transmitting a starting time of the refresh time interval to a bank controller;
sampling a continuous refresh status indicative of a number of refreshes necessary to maintain data within a cache memory bank associated with the bank controller, the continuous refresh status being a combination of refresh request signals updated based on a concurrent refresh status of embedded dynamic random access memory (EDRAM) macros in operative communication with the bank controller;
requesting a gap in a processing pipeline of the cache memory to facilitate the number of refreshes necessary;
receiving a refresh grant in response to the requesting; and
transmitting an encoded refresh command to the bank controller, the encoded refresh command indicating a number of refresh operations granted to the cache memory bank associated with the bank controller.

18. The method of claim 17, wherein the method further comprises:
receiving the starting time of the refresh time interval at the bank controller; and
updating the continuous refresh status, the continuous refresh status update being a logical vector representing a number of refresh operations required within the cache memory bank associated with the bank controller.

19. The method of claim 17, wherein the method further comprises:
receiving the starting time of the refresh time interval at the bank controller; and
updating the continuous refresh status, the continuous refresh status update being gathered as a logical OR output of a plurality of EDRAM macro refresh requests, each refresh request of the plurality of EDRAM macro refresh requests representing a maximum number of refresh operations required by each respective EDRAM macro.

20. The method of claim 17, wherein calculating the refresh time interval includes:
selecting between a predetermined number of different refresh frequencies.

21. The method of claim 17, wherein a plurality of different refresh time interval starting times are transmitted to a plurality of different bank controllers, each bank controller being local to, and associated with, only one cache memory bank of the cache memory, and each cache memory bank of the cache memory being associated with only one bank controller.

22. The method of claim 21, wherein the plurality of different refresh time interval starting times are staggered.

* * * * *